May 2, 1961  F. T. MILES  2,982,709
NEUTRONIC REACTOR DESIGN TO REDUCE NEUTRON LOSS
Filed Nov. 16, 1956
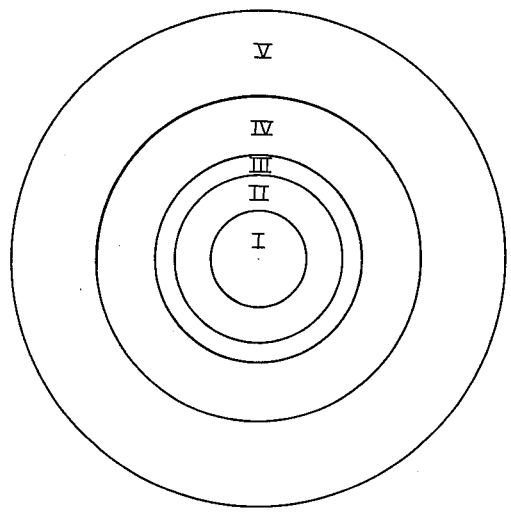
INVENTOR.
FRANCIS T. MILES
BY United States Patent Office 2,982,709
Patented May 2, 1961

2,982,709

NEUTRONIC REACTOR DESIGN TO REDUCE NEUTRON LOSS

Francis T. Miles, Blue Point, N.Y., assignor to the United States of America as represented by the United States Atomic Energy Commission Filed Nov. 16, 1956, Ser. No. 622,722

2 Claims. (Cl. 204—193.2)

The present invention relates to an apparatus useful in reducing or partially preventing the loss of slow neutrons to elements in a region of high neutron flux, having high capture cross sections for slow neutrons.

Most nuclear reactors which rely on the interaction of slow neutrons and nuclear fuel to produce a self-sustaining fission reaction, rely also on the use of a moderating substance in conjunction with the reactor core to slow the neutron resulting from the fission reaction. It is sometimes necessary to incorporate elements or articles in a reactor or use them in conjunction with a reactor, which elements capture slow neutrons. For example, container walls and other structural elements may be a source of serious loss of neutrons.

One of the objects of the invention is to provide a reactor design for reducing or avoiding the loss of slow neutrons to these elements.

Other objects will be in part apparent and in part pointed out hereinafter.

For greater clarity of understanding some of the novel features of reactors provided in accordance with the subject invention, reference is made to the accompanying figure which is a schematic representation of the zones in a nuclear reactor. The production of neutrons and the use of these neutrons both in sustaining the nuclear reaction and in converting a fertile material into a fissionable or other useful material as these steps relate to the practice of the instant invention will be illustratively explained with reference to this figure.

In one of its broader aspects, the objects of the present invention are achieved by interposing an unmoderated layer of a substance having a high fission cross section for slow neutrons between the source of slow neutrons and an element substantially composed of a slow neutron poison, and supplying neutrons to said layer to produce fast neutrons therein.

With reference to the accompanying figure, one use which can be made of the subject invention is now described. It will be noted that the figure is a representation of five concentric circular zones, the innermost, I, being the entire area within the circle, the next, II, being that between the inner and outer circles and the others, correspondingly, the areas included between the other circles. The Roman numerals inscribed in each area are employed in this text to indicate these respective areas. For purposes of illustration and discussion the zones may be considered as those resulting from horizontally sectioning the center of a substantially spherical reactor. Inlet and outlet, control and other facilities are deemed to be located in the region above and below the point at which the horizontal section represented in the figure is taken. Except for the means for removal and introduction of materials and controls from and to the reactor, it can be considered as consisting of a sphere comprising 5 concentric zones each defined by spherical surfaces.

The innermost zone may be considered a homogeneous mixture of $U^{233}$ or $U^{235}$ in liquid bismuth together with a moderator such as baryllium or graphite. The second zone II comprises an "immoderate" or unmoderated mixture of $U^{233}$ in liquid bismuth from which substantially all moderator is absent. Zones I and II constitute the core of the reactor. The third zone III is a container for retaining the uranium-bismuth composition in the core and for separating the core from the external blanket region. The fourth zone IV contains the fertile material and forms the inner layer of the blanket. This fourth zone may contain thorium in some concentrated form and should be substantially completely free from neutron moderating substances. The fifth zone V also contains some fertile material and a substantial amount of moderator material and comprises the outer layer of the blanket. A sixth zone, not shown, at the outer extremity of such an apparatus might be composed entirely of a moderating substance such as graphite and serve as a neutron reflector for reflecting neutrons passing outward from zone V back into the apparatus.

It will be apparent that in a reactor having zones such as those indicated above, it is desirable to restrict the nuclear fuel solutions to the core of the reactor and at the same time provide for a highly efficient transfer of neutrons from this core to the blanket portion of the reactor. The efficiency of the conversion of fertile material to fuel will depend at least in large part on the efficiency of the capture of neutrons leaking from the core to the blanket. It is apparent however that a container, such as a steel container for the core region, will intercept large quantities of the slow neutrons ambling toward the fertile material in the blanket inasmuch as the diffusion length of slow neutrons in iron is only about 1.8 centimeters at temperatures in the order of 500° C.

In previously designed reactors, the interception of slow neutrons by a steel wall resulted in a serious loss of neutrons due to the high capture cross section of steel for slow neutrons. In such reactors all of the core, including both zones I and II, is filled with fuel and moderating compositions. However, in accordance with the present invention, the core is divided up into two zones to interpose an unmoderated layer of fissionable material between the source of slow neutrons in zone I of the core, and the poisonous element in zone III. It is possible in this manner largely to avoid the loss of neutrons to the reactor wall III.

A substantial fraction of the slow neutrons leaving the core region I are captured by fissionable materials in zone II and produce fast neutrons. A considerably smaller fraction of fast neutrons incident on a steel container of one centimeter thickness are captured in the container. From this it is evident that the capture in zone III of a large number of neutrons leaving zone I as slow, is avoided by the interposition of an immoderate layer of a material fissionable by slow neutrons between the slow neutron source and the poison. A current of slow neutrons incident at the inner boundary of the "immoderate" layer in zone II, where this zone is three diffusion lengths in thickness, is approximately 10 times as great as the slow neutron current at the outer boundary of the layer. A major fraction of slow neutrons entering zone II from zone I are exchanged for fast neutrons for this case.

An additional feature of the subject invention which pertains to a reactor of the illustrated configuration results from the division of the blanket region into the inner and outer zones IV and V respectively as shown. Zone IV contains no moderating substance. Fast neutrons from the core which are not captured in this zone pass to zone V where they may be moderated and captured, and to some extent reflected back in the general direction of the core portion of the reactor. The zone IV serves as an immoderated or unmoderated zone similar to zone II in that it captures a large fraction of the slow neutrons which enter the zone. In this case the zone comprises almost pure blanket material such as some thorium-containing composition. A quantity of the thorium-containing material is also mixed with the moderator in zone V to assist in the adsorption of slow neutrons in this region.

The thickness of the immoderated zone II determines the ratio of fast to slow neutrons at the container boundary. This ratio increases with increasing thickness of the immoderated layer. Correspondingly the thickness of the thorium containing zone IV determines the number of slow neutrons leaking back into the container zone III.

Where no reflector external to zone V is used zone V should be thick enough to slow down almost all of the fast neutrons as this increases the efficiency of neutron absorption in thorium. The presence of a moderated zone V causes the slow neutron flux to build up near the interface between zones IV and V. This is because some fast neutrons are converted to slow neutrons in passing through zone IV and because some neutrons are moderated and reflected from zone V back into zone IV.

It is preferred to provide a thickness of zone IV such that a minimum number of slow neutrons diffuse back into the container as their absorption in the container is of no advantage. A zone IV thickness of approximately three diffusion lengths for slow neutrons is preferred as this thickness, when used in conjunction with a moderated zone V, permits a breeding gain to be achieved. A diffusion length of approximately 15 centimeters exists for slow neutrons diffusing through an unmoderated material such as thorium fluoride. In other blanket materials slow neutrons have different diffusion lengths. Thus for a thorium fluoride blanket to be employed in conjunction with a spherical reactor having the configuration given above, a thickness of the order of 45 centimeters is satisfactory for the production of a breeding gain.

Approximately 95% of fast neutrons incident on zone IV should be slowed down and absorbed in thorium in order to have a breeding gain. A breeding gain exists when the ratio of the number of atoms of fissionable material used up to the number of such atoms produced exceeds unity. If a 1 centimeter steel container and a surrounding thorium fluoride immoderated blanket are used, the use of a moderated zone V is indicated as otherwise a thorium fluoride blanket of 250 centimeters would be needed to achieve a breeding gain. The use of the mixture of moderator and fertile material in zone V substantially reduces this blanket thickness. If a reactor of the approximate configuration shown in the figure is used, and two immoderated zones II and IV are employed, each having a thickness equivalent to at least three diffusion lengths for slow neutrons, it is possible to get a 10% breeding gain employing a steel container 1 centimeter thick. The immoderated layer in the core is of prime importance in this respect in the achievement of a breeding gain as this is primarily responsible for the efficient removal of neutrons from the core. The separation of the blanket into immoderated, moderated and reflector regions is responsible for the high efficiency of capture and utilization of the neutrons. To achieve a 10% breeding gain the immoderated layer II of the core must be at least three diffusion lengths thick. That is, zone II must have a thickness approximately equal to three times the diffusion length of a slow neutron in this zone. For uranium, because it is a good absorber, the diffusion length for thermal neutrons is small.

The foregoing has reference to the use of the subject scheme in connection with nuclear reactors. However, it will be apparent that the scheme has numerous other applications in reactor and related technology in situations where avoidance of the loss of slow neutrons is desired. The foregoing is described with reference to a nuclear reactor employing a uranium solution in bismuth as the core and a thorium fluoride blanket. The invention has utility in connection with transfer of neutrons from a self-sustaining nuclear reactor core region to a blanket of some substance to be irradiated with neutrons for the production of isotopes. For example radioactive isotopes of cobalt, tantalum or other substance may be produced efficiently in a blanket similar to that described above for use in irradiating thorium. The use of immoderated, moderated and reflector zones as taught herein is advantageous in this connection. For purposes of this application an immoderated or unmoderated zone is one which is substantially completely free of a moderating substance.

In general where it is sought to transmute a particular isotope in a material to another isotope by means of neutron capture, using an apparatus including a slow neutron source within a slow neutron capturing container and the material disposed to receive neutrons outside the container, an improvement in the transmutation can be achieved by interposing an unmoderated layer of a substance having a high fission cross section for slow neutrons between the source and the portion of the container proximate the material. Where the transmutation occurs from slow neutron capture the incorporation of the material in unmoderated and moderated zones as well as the use of a reflector zone as described is advantageous in increasing the efficiency of the transmutation.

The efficiency of immoderated layers in converting slow neutrons passing therethrough to fast neutrons can be determined by suitable placement of metal foils at these boundaries to induce radioactivity therein and the measurement of radioactivity induced. Cadmium and indium foils are useful in this connection as they preferentially capture neutrons of certain energies. The neutron flux gradient can be calculated from the results of such measurements. The efficiency of an immoderator is not greatly improved after the thickness reaches three times the diffusion length of slow neutrons therein. While this is the optimum thickness a smaller thickness may be determined by other criteria such as cost, heat transfer and other factors.

Since many embodiments might be made in the present invention and since many changes might be made in the embodiment described, it is to be understood that the foregoing description is to be interpreted as illustrative only and not in a limiting sense.

I claim:

1. In a reactor having a neutron moderated core, a steel container enveloping the core and a blanket of fertile material positioned outside the container to receive neutrons, the improvement which comprises an unmoderated layer containing fissionable material selected from the group consisting of uranium-233 and uranium-235, said layer having a thickness of the order of three fold the diffusion length of slow neutrons therein and said layer being interposed between the moderated portion of the core and the metal container, an unmoderated layer of fertile material lining a major portion of the external surface of the metal container and a moderated layer of fertile material disposed outermost from and enveloping the unmoderated layer of fertile material.

2. In a reactor having a neutron moderated core, a steel container enveloping the core and a blanket of fertile material positioned outside the container to receive neutrons, the improvement which comprises an unmoderated layer containing fissionable material selected from the group consisting of uranium-233 and uranium-235, said layer being interposed between the moderated portion of the core and the metal container, an unmoderated layer of fertile material on the external surface of the metal container and a moderated layer of fertile material disposed outermost from and enveloping the unmoderated layer of fertile material, said unmoderated layer containing fissionable material having a thickness of approximately three times the diffusion length of a slow neutron therein and the unmoderated layer of fertile material having a thickness of approximately three times the diffusion length of slow neutrons therein.

References Cited in the file of this patent

UNITED STATES PATENTS

| | | |
|---|---|---|
| 2,714,668 | Zinn | Aug. 2, 1955 |
| 2,728,867 | Wilson | Dec. 27, 1955 |
| 2,778,950 | Frey et al. | Jan. 22, 1957 |

OTHER REFERENCES

Proceedings of the International Conference on the Peaceful Uses of Atomic Energy, Aug. 8-20, 1955, vol. 2, pages 311-312.

Proceedings of the International Conference on the Peaceful Use of Atomic Energy, published by United Nations, New York (1955), volume 3, page 251.